United States Patent [19]
Lee

[11] Patent Number: 5,825,746
[45] Date of Patent: Oct. 20, 1998

[54] DISK DRIVE HAVING ECCENTRICITY CORRECTION DEVICE

[75] Inventor: Jong-Wan Lee, Suwon, Rep. of Korea

[73] Assignee: Samsung Electronics Co., Ltd., Kyungki-Do, Rep. of Korea

[21] Appl. No.: 731,134

[22] Filed: Oct. 10, 1996

[30] Foreign Application Priority Data

Nov. 20, 1995 [KR] Rep. of Korea ........................ 95-42359
Nov. 20, 1995 [KR] Rep. of Korea ........................ 95-42361

[51] Int. Cl.$^6$ .................................................. G11B 23/00
[52] U.S. Cl. .............................................. 369/270; 369/264
[58] Field of Search ................................... 369/264, 263, 369/266, 270, 271

[56] References Cited

U.S. PATENT DOCUMENTS

| | | | |
|---|---|---|---|
| 4,138,663 | 2/1979 | Lehureau et al. | 340/164.3 |
| 4,441,178 | 4/1984 | Kobayashi et al. | 369/270 |
| 4,933,927 | 6/1990 | Ross | 369/270 |
| 5,043,973 | 8/1991 | Ocheltree et al. | 369/270 |
| 5,228,023 | 7/1993 | Hartog | 369/263 |
| 5,627,810 | 5/1997 | Ohmori et al. | 369/270 X |

OTHER PUBLICATIONS

JAPIO Abstract Accession No. 03876161 & JP 040241261 A (Dainippon) 28 Aug. 1992 (Abstract).
JAPIO Abstract Accession No. 03420367 & JP 030083267 A (NEC) 09 Apr. 1991 (Abstract).
JAPIO Abstract Accession No. 02967061 & JP 010264661 A (Victor) 20Oct. 1989 (Abstract).

*Primary Examiner*—Stuart S. Levy
*Assistant Examiner*—William J. Klimowicz
*Attorney, Agent, or Firm*—Sughrue, Mion, Zinn, Macpeak & Seas, PLLC

[57] ABSTRACT

In an optical disk drive having an eccentricity correction device for correcting the eccentricity of a disk loaded on a turntable, a central ring is installed on the turntable to move the disk loaded on the turntable by a predetermined distance from the center of rotation of the turntable, and the central ring is properly moved by a moving mechanism. Therefore, the eccentricity of the disk can be precisely corrected, and, when a pickup records or reproduces information, the time for tracking can be sharply reduced and tracking errors can be prevented.

4 Claims, 12 Drawing Sheets

DISK DRIVE HAVING ECCENTRICITY CORRECTION DEVICE

BACKGROUND OF THE INVENTION

The present invention relates to a disk drive and, more particularly, to a disk drive equipped with a correction device for correcting the eccentricity of a rotating disk.

A general disk drive, such as a laser disk drive using a laser disk, a compact disk drive using a compact disk, and a magneto-optical disk drive, is provided with a pickup for projecting a light beam onto a rotating disk, and receiving the light beam reflected from the disk to record data onto the disk or reproduce data from the disk.

Referring to FIG. 1, in a conventional disk drive, a disk 1 is loaded on a turntable 3 coupled to the rotating axis of a spindle motor 2 fixed to a deck 13. A pickup 4 for projecting a laser beam onto the disk 1 and receiving the reflected beam therefrom is moved in a radial direction of the disk 1 by a pickup transferring means 5.

The pickup 4 scans the tracks of the disk 1 with the laser beam and reads or writes information thereon. When recording onto the disk 1, the tracks must be formed in a consistent manner in the radial direction from the center of the disk 1. If the disk 1 loaded on the turntable 3 rotates off center, the tracks are also formed in an eccentric manner on the disk 1. Also, the information on the disk 1 having eccentric tracks is difficult to reproduce in another normal disk drive. Generally, tracking coils (not shown) provided in the pickup 4 can correct this eccentricity, or the pickup transferring means 5 can correct the eccentricity by moving the pickup 4 in the radial direction of the disk 1. However, if the eccentricity exceeds the allowable error, such solutions are not effective, thereby making reproduction impossible.

FIG. 2 is a sectional view showing a portion of an eccentricity correction device 12 used in the conventional disk drive of FIG. 1. The turntable 3 is fixedly attached to the axis 2' of the spindle motor 2 onto which a stop ring 6 is coupled. On the upper surface of the stop ring 6, a circular groove 7 is formed for receiving a magnet 8, and the magnet 8 attracts a clamp 9 magnetically for securing the disk 1 onto the turntable 3 after the disk 1 is loaded on the turntable 3. Also, a central ring 10 and a spring 11 under the central ring 10 are installed between the turntable 3 and the stop ring 6 to allow up and down movements thereof. At this time, the radius at the lower portion of the stop ring 6 is smaller than the radius of the center hole on the disk 1. The radius of the central ring 10 at its widest portion is larger than the radius of the center hole on the disk 1.

The conventional disk drive having such a configuration operates as follows. The disk 1 on an unshown tray is moved onto the turntable 3 in a well known manner, and the deck 13 (FIG. 1) and the turntable 3 are moved upward. As the turntable 3 moves upward, the leading end of the stop ring 6 passes through the center hole of the disk 1, and the sloped surface 16 of the central ring 10 contacts and supports the disk 1. As the disk 1 becomes situated on the sloped surface 16, the eccentricity of the disk 1 is corrected. Also, as the turntable 3 moves upward, the disk 1 comes into contact with the clamp 9. When the disk 1 contacts the clamp 9, the magnet 8 in the stop ring 6 attracts the clamp 9 due to its magnetic force, thereby securing the disk 1 onto the turntable 3.

In the disk drive having the eccentricity correction device 12 as described above, the eccentricity of the disk 1 is corrected by the sloped surface 16 formed on the central ring 10. However, the central ring 10 may be off-center as it moves upward and downward between the turntable 3 and stop ring 6. If the central ring 10 is eccentric by 0.1 mm, the disk 1 having a track interval of 1.6 μm and rotating on the turntable 3 is eccentric by 625 tracks. Therefore, the pickup 4 (FIG. 1) records information on other tracks instead of predetermined tracks, tracking takes longer during reproduction, or the information on the predetermined tracks cannot be reproduced.

SUMMARY OF THE INVENTION

It is an object of the present invention to provide a disk drive having an eccentricity correction device which can precisely correct the eccentricity of a disk.

To accomplish the above object, there is provided an optical disk drive comprising: a base frame; a spindle motor supported by the base frame and having a shaft; a turntable, attached to the shaft of the spindle motor, for loading a disk thereon, the turntable defining a center of rotation; a clamp for securing the disk onto the turntable; a disk moving portion for supporting the disk by being inserted into a center hole of the disk, and moving the disk by a predetermined distance in a horizontal direction with respect to the disk from the center of rotation of the turntable; lifting means for lifting the clamp and releasing the disk loaded on the turntable; and moving means installed on the base frame, for lifting the lifting means and moving the disk moving portion by a predetermined distance.

It is preferable that the turntable has a plurality of holes symmetrically formed therein, and the disk moving portion comprises a central ring interlocking with the moving means and moving horizontally by a predetermined distance from the center of rotation of the turntable, and a plurality of protrusions formed on the central ring for supporting the disk by passing through the holes in the turntable and being inserted into the center hole of the disk. Also, it is preferable that the lifting means comprises a pushing ring interlocking with the moving means, and a plurality of pushing rods formed on the pushing ring such that the pushing rods respectively pass through the holes of the turntable, for pushing the clamp up when the pushing ring is lifted by the moving means. It is preferable that the moving means comprises a moving rod on which a sloped surface for contacting and lifting the lifting means is formed at one end and on which a protrusion for contacting and horizontally moving the disk moving portion is formed, and driving means for moving the moving rod.

According to another aspect of the present invention, there is provided an optical disk drive comprising: a base frame; a spindle motor supported by the base frame and having a shaft; a turntable, attached to the shaft of the spindle motor, for loading a disk thereon, the turntable defining a center of rotation; a clamp for securing the disk onto the turntable; a disk moving portion for supporting the disk by being inserted into a center hole of the disk, and moving the disk by a predetermined distance in a horizontal direction with respect to the disk from the center of rotation of the turntable; moving means for moving the disk moving portion by a predetermined distance.

It is preferable that the turntable has a plurality of holes symmetrically formed therein, and the disk moving portion comprises a central ring interlocking with the moving means and moving horizontally by a predetermined distance from the center of rotation of the turntable, and a plurality of protrusions formed on the central ring for supporting the disk by passing through the holes in the turntable and being inserted into the center hole of the disk. Also, preferably, the moving means comprises a lever hinged on the base frame at one end thereof by a hinge and a pivoting means installed at the other end of the lever, for pivoting the lever around the hinge, and wherein the lever moves the disk moving portion horizontally.

The present invention having such components properly corrects the disk eccentricity on the turntable. Therefore, accurate tracking is possible, thus preventing errors generated during recording and reproduction.

BRIEF DESCRIPTION OF THE DRAWINGS

The above object and advantages of the present invention will become more apparent by describing in detail preferred embodiments thereof with reference to the accompanying drawings, in which.

DETAILED DESCRIPTION OF THE PREFERRED EMBODIMENTS

Hereinbelow, a preferred first embodiment of a disk drive having an eccentricity correction device according to the present invention will be described in detail with reference to FIGS. 3 through 9.

Figure 1:
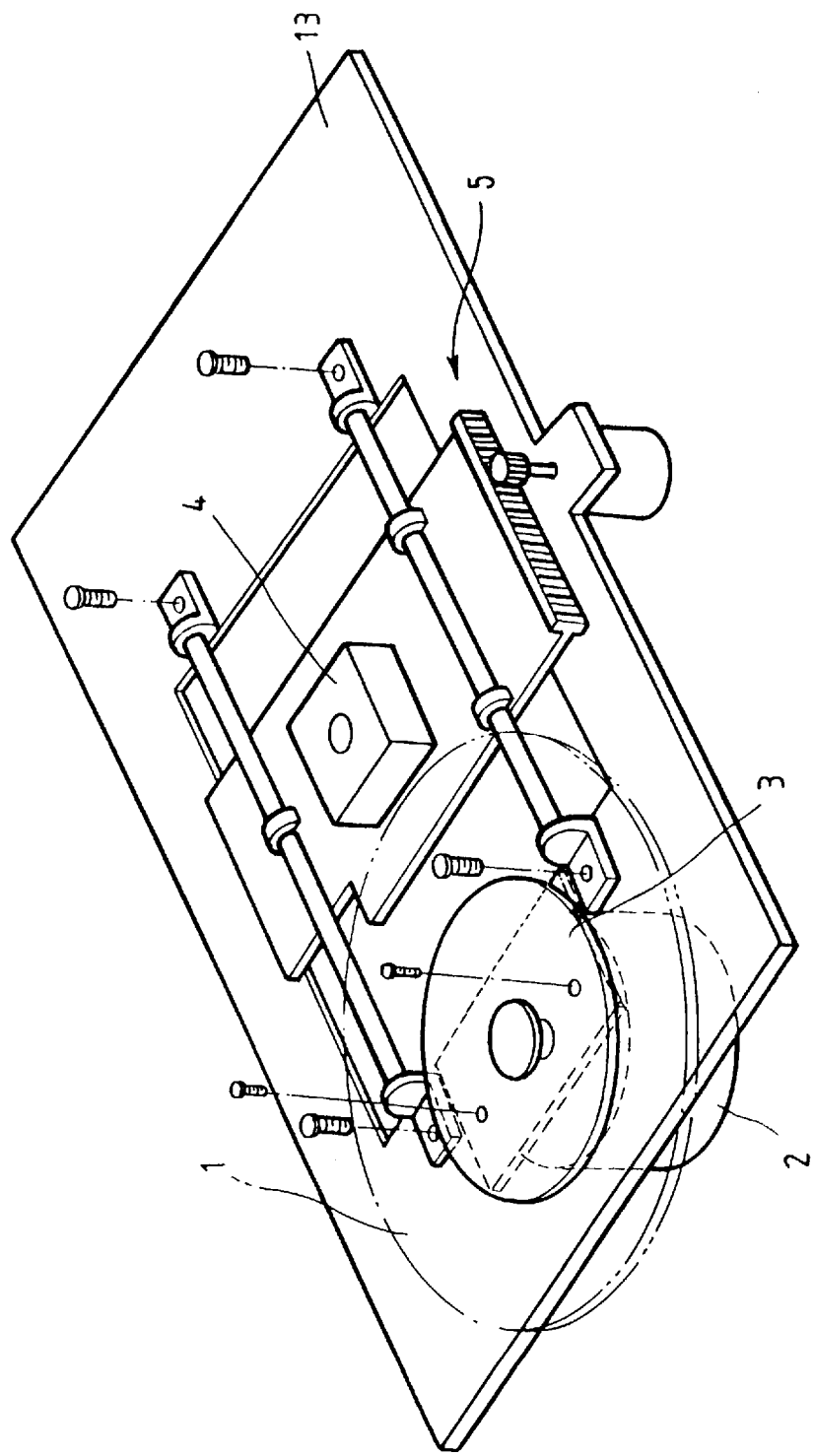
FIG. 1 is a perspective view showing the essential parts of a conventional disk drive.
Figure 2:
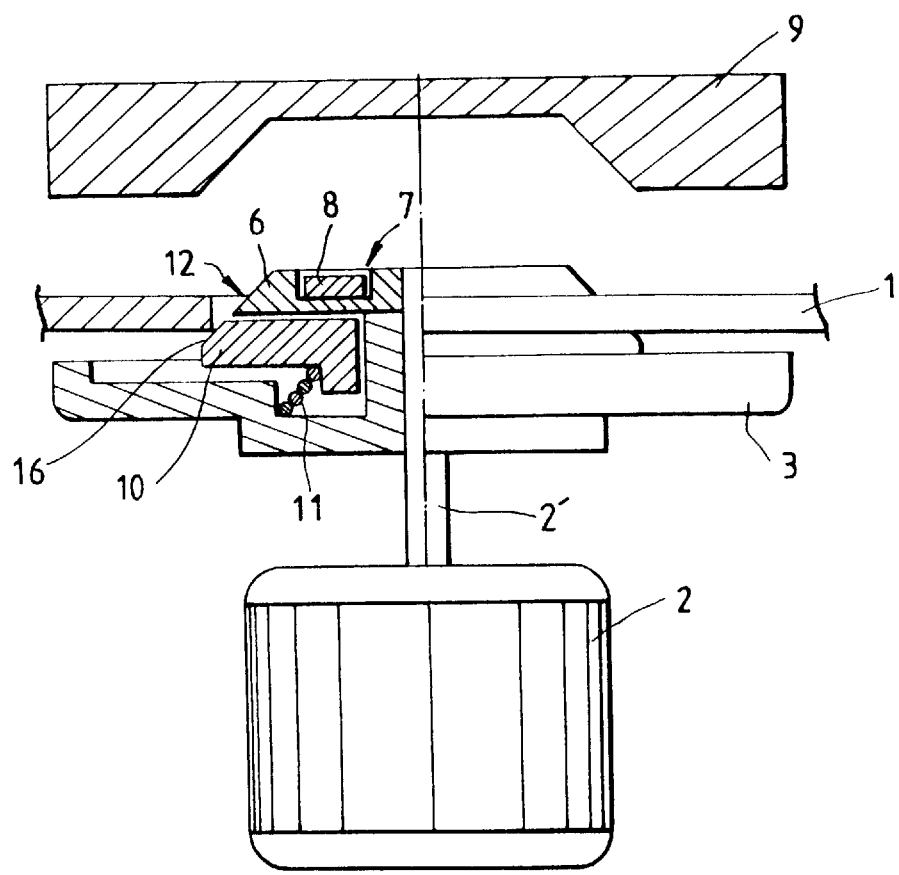
FIG. 2 is a partial sectional view showing an eccentricity correction device in the disk drive of FIG. 1.
Figure 3:
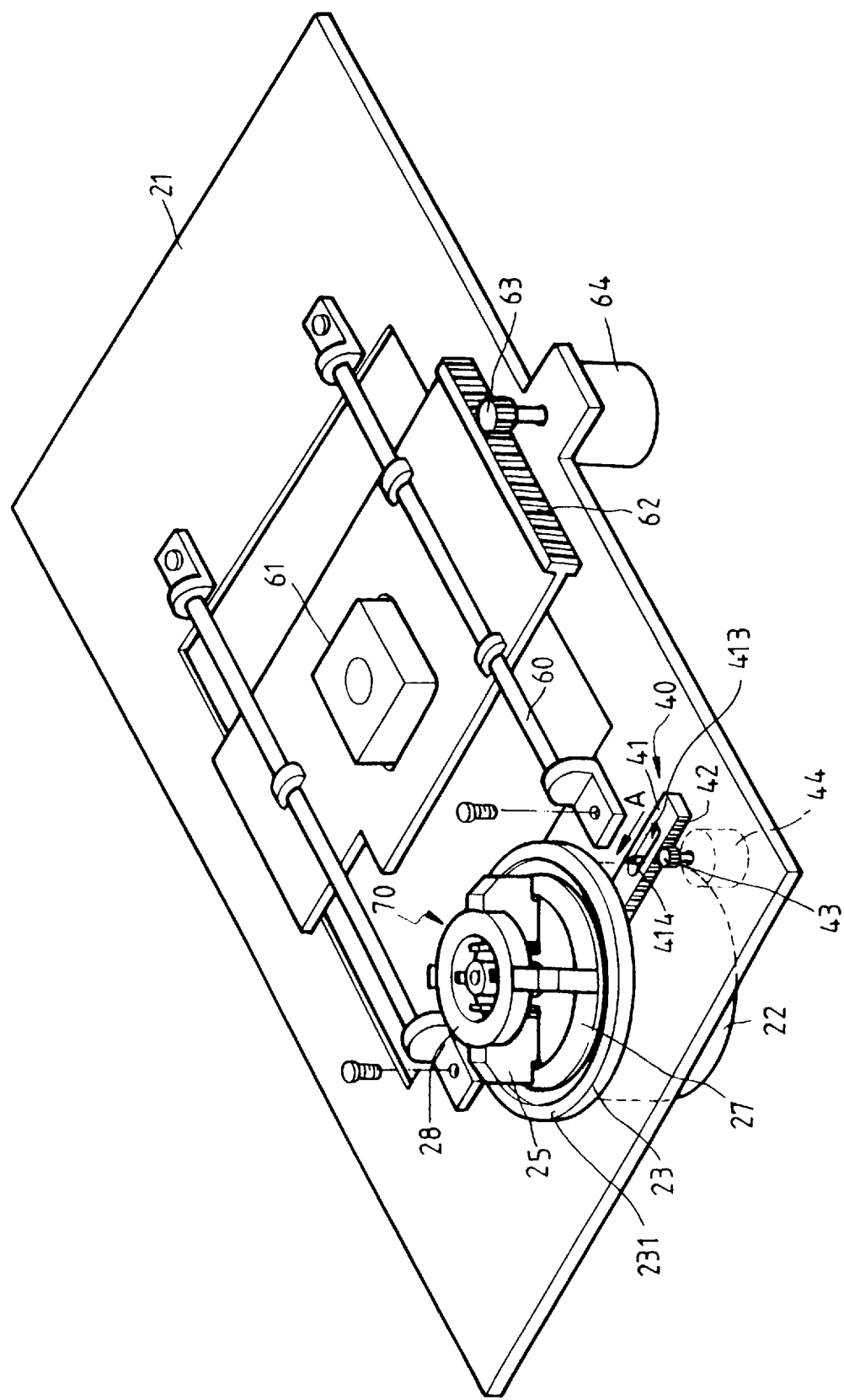
FIG. 3 is a perspective view showing the essential parts of a disk drive having an eccentricity correction device according to a first embodiment of the present invention.
Figure 4:
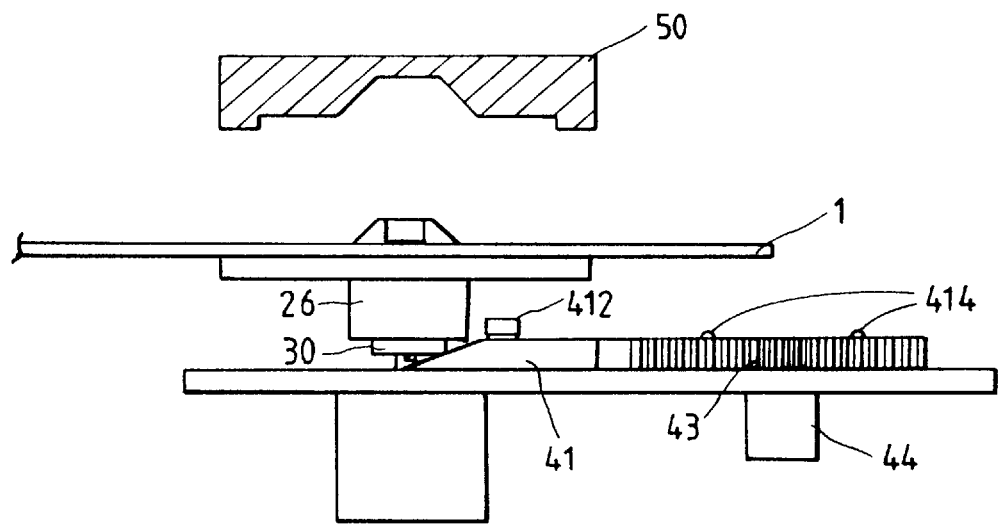
FIG. 4 is a side view of the disk drive of FIG. 3.

As shown in FIGS. 3 and 4, the disk drive having an eccentricity correction device according to the present invention includes a spindle motor 22 for rotating a disk 1, and a pickup 61 for recording or reproducing information by projecting a laser beam onto the disk 1 and receiving the reflected beam.

The pickup 61 is moved in a radial direction of the disk 1 via pickup transferring means which includes two parallel guide rails 60 fixed on a base frame 21 and guiding the pickup 61 supported thereon. A rack 62 is formed on one side of the pickup 61. A pinion 63 engages with the rack 62. The pinion 63 is fixed on the shaft of a pickup transferring motor 64 which is attached to the base frame 21. Accordingly, the pickup 61 is moved in a radial direction of the turntable 23 along the guide rails 60 by the rotation of the pickup transferring motor 64.

The eccentricity of the disk 1 rotated by the spindle motor 22 is corrected by the eccentricity correction device. The eccentricity correction device comprises a disk moving portion 70 installed on the turntable 23 to move the rotating disk 1 by a distance corresponding to the disk eccentricity from the rotating center of the turntable 23, and moving means 40 installed on the base frame 21 to properly transfer the disk moving portion 70.

Figure 5:
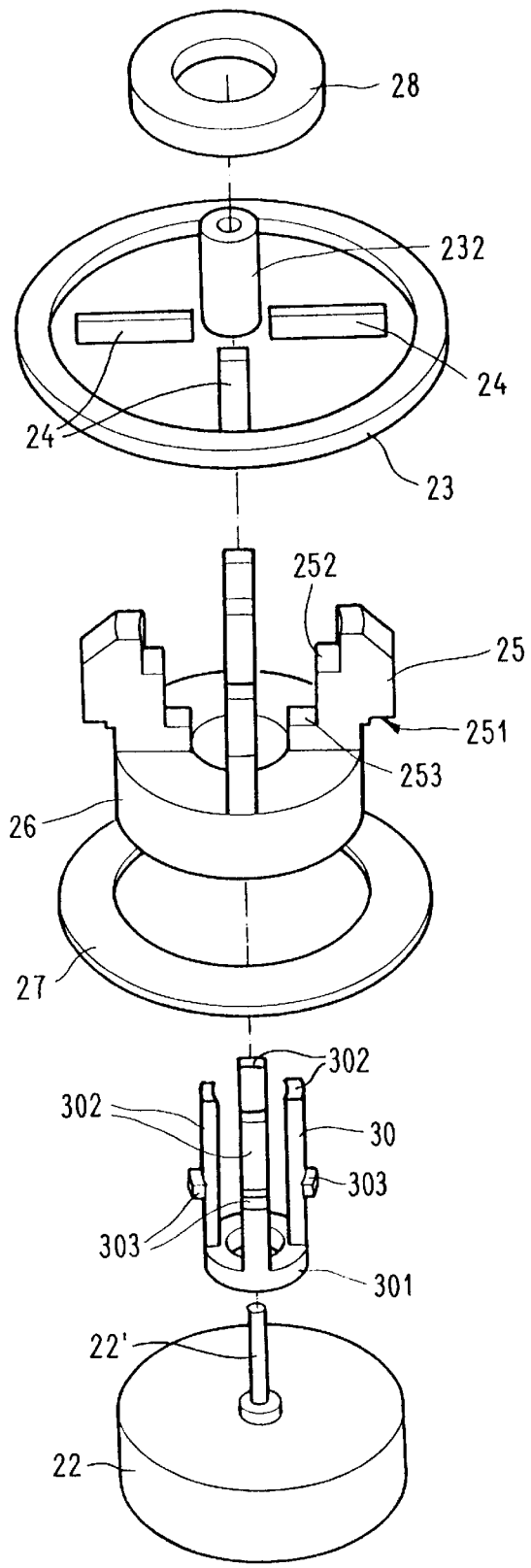
FIG. 5 is an exploded perspective view showing a disk moving portion of the eccentricity correction device in the disk drive of FIG. 3.

The disk moving portion 70 will be described with reference to FIGS. 3, 5, and 6. The turntable 23, on which a plurality of holes 24 are symmetrically formed, is fixedly attached to the shaft 22' of the spindle motor 22 installed on the base frame 21. A central ring 26, on which protrusions 25 with first, second, and third steps 251, 252, and 253 are formed corresponding to the number of the holes 24, is installed between the turntable 23 and the spindle motor 22.

The protrusions 25 of the central ring 26 pass through the holes 24 of the turntable 23, and protrude higher than the upper surface 231 (see FIG. 3) of the turntable 23. The central ring 26, to be described later, is installed so as to be movable by a predetermined distance from the rotating center of the turntable 23 via the moving means 40.

Figure 6:
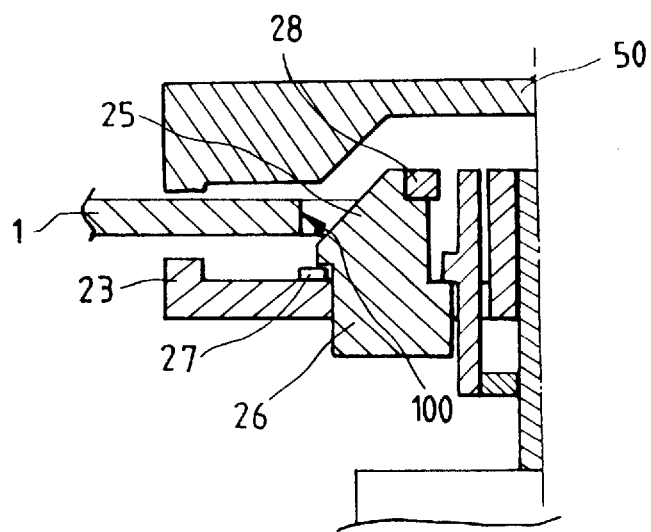
FIG. 6 is a sectional view showing the disk moving portion of FIG. 5.

As shown in FIG. 6, the protrusions 25 of the central ring 26 pass through a center hole 100 of the disk 1 such that the disk 1 loads on the turntable 23.

A ring 27 is installed between the first step 251 of the protrusion 25 and the upper surface 231 of the turntable 23 (see FIG. 6). The ring 27 supports the central ring 26 to prevent the central ring 26 from contacting the base frame 21 (FIG. 3). A magnet 28 is provided on the second step 252 of the protrusion 25. This magnet 28 attracts the clamp 50 (FIG. 6) by magnetic force so that the disk 1 loaded on the turntable 23 is secured thereto.

A clamp pushing member 30 is installed between a bush 232 of the turntable 23 and the central ring 26 so that up and down movements of the clamp pushing member 30 are possible. The clamp pushing member 30 comprises a plurality of pushing rods 302 on each of which a pushing protrusion 303 is formed, and a pushing ring 301 on which the pushing rods 302 are formed. When the moving means 40 (FIG. 3) (to be described later) pushes the central ring 26, the clamp 50 is lifted by the clamp pushing member 30, thereby releasing from the disk 1 loaded on the turntable 23.

The pushing rods 302 respectively pass through the holes 24 formed on the turntable 23. The clamp pushing member 30 is supported by having the pushing protrusions 303 contact the upper surfaces of the third step 253 formed on the protrusions 25.

Figure 7:
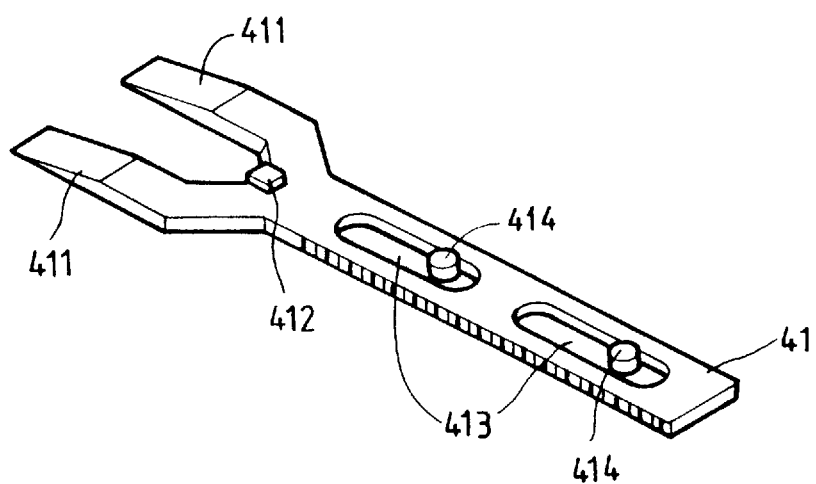
FIG. 7 is a perspective view showing a moving rod in the disk drive of FIG. 3.

The moving means 40 will be described with reference to FIGS. 3, 4, and 7. This moving means 40 includes a moving rod 41 movably installed on the base frame 21 such that movements in the direction of arrow A (FIG. 3) and in the opposite direction are possible, and driving means for moving the moving rod 41.

Sloped surfaces 411 (FIG. 7), a protrusion 412, and slots 413 are formed on the moving rod 41. As the moving rod 41 moves in the direction of arrow A by the driving means, the sloped surfaces 411 contact and lift the clamp pushing member 30 (FIG. 4), and the protrusion 412 pushes and moves the central ring 26. Also, pins 414 fixed on the base frame 21 fit into the slots 413 (FIG. 7), and thus guide the moving rod 41 so that the movement of the moving rod 41 is limited to the directions of arrow A and opposite to the arrow A.

The driving means of the moving means 40 includes a rack 42 (FIG. 3) formed on the side of the moving rod 41, a pinion 43 engaged with the rack 42, and a motor 44 for rotating the pinion 43. The driving means moves the moving rod 41 in the direction of arrow A or in the opposite direction by a predetermined distance depending on the rotating direction of the motor 44.

The operation of the disk drive having an eccentricity correction device according to the present invention constituted by the above components will be described with reference to FIGS. 8 and 9.

Figure 8:
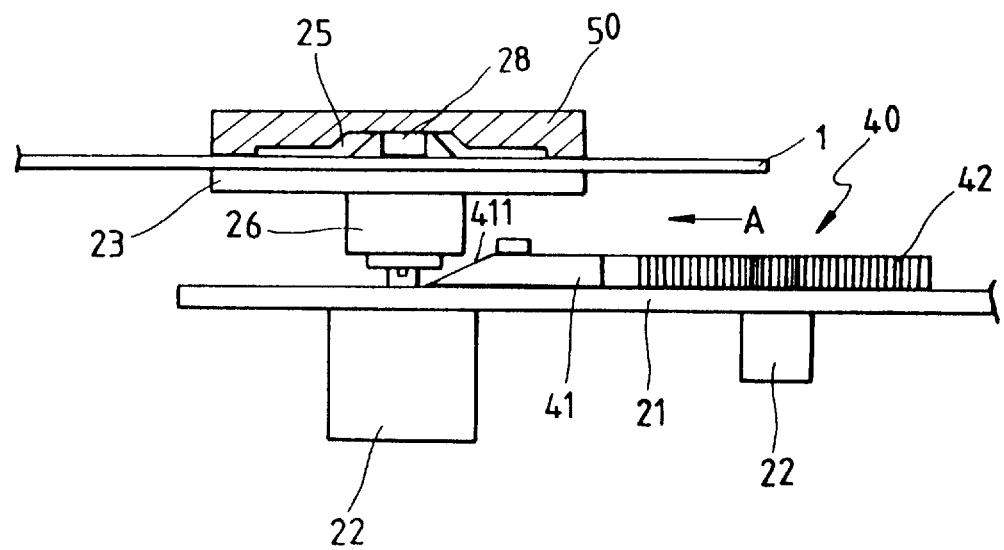
FIG. 8 is a side view showing the state of a disk loaded onto a turntable by a clamp in the disk drive of FIG. 3.

When the disk 1 is safely loaded on an unshown tray and placed onto the upper part of the turntable 23 shown in FIG. 8, the base frame 21 and the turntable 23 ascend as in the conventional device.

As the turntable 23 is elevated, the protrusions 25 formed on the central ring 26 are inserted into the unshown center hole of the disk 1 so that the disk 1 is loaded on the turntable 23. As the turntable 23 continues to ascend, the disk 1 comes into contact with the clamp 50. The magnet 28 fixed on the central ring 26 attracts the clamp 50 so that the disk 1 fits securely onto the turntable 23. Subsequently, the pickup 61 (see FIG. 3) projects a laser beam onto the tracks of the disk 1 and then reads the information recorded on the tracks, and also reads the extent of eccentricity of the tracks. An unshown controller calculates the extent of the eccentricity of the tracks, and stops the rotation of the spindle motor 22 to be located such that the eccentricity of the disk 1 can be compensated for by movement of the moving rod 41, for example, the eccentricity direction is parallel with the movement direction A of the moving rod 41 when the counted value exceeds an allowable error range. A suitable controller is disclosed in, for example, U.S. Pat. No. 4,138,663 issued Feb. 6, 1979 and which is incorporated herein by reference. At this stage, the spindle motor 22 is suspended temporarily by the controller and located so that the eccentricity of the disk 1 can be compensated by moving the moving rod 41 in the direction of arrow A.

Figure 9:
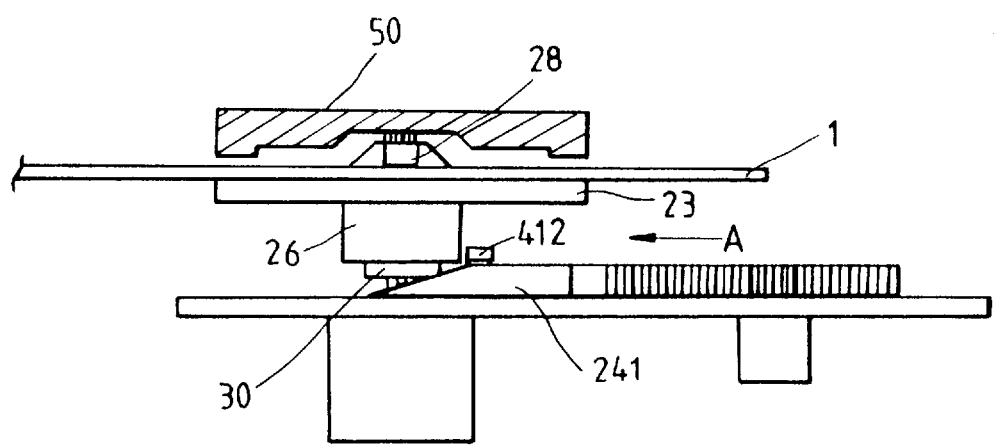
FIG. 9 is a side view showing the state of a clamp raised by a clamp pushing rod in the disk drive of FIG. 3.

As the moving rod 41 is moved in the direction of arrow A by rotation of the motor 44, as shown in FIG. 9, the clamp pushing member 30 is pushed up by the sloped surfaces 411, and the clamp pushing member 30 pushes the clamp 50 attaching the disk 1 onto the turntable 23 up to thereby release the disk 1. Then, the protrusion 412 formed on the moving rod 41 pushes and moves the central ring 26 by a distance corresponding to the degree of eccentricity. At this time, since the disk 1 is not clamped by the clamp 50, the central ring 26 and the disk 1 can move freely, and the eccentricity error can be corrected.

A preferred second embodiment of a disk drive having an eccentricity correction device according to the present invention will be described in detail with reference to FIGS. 10 to 13. The same reference numerals as those of the previous drawings designate the same elements.

Figure 10:
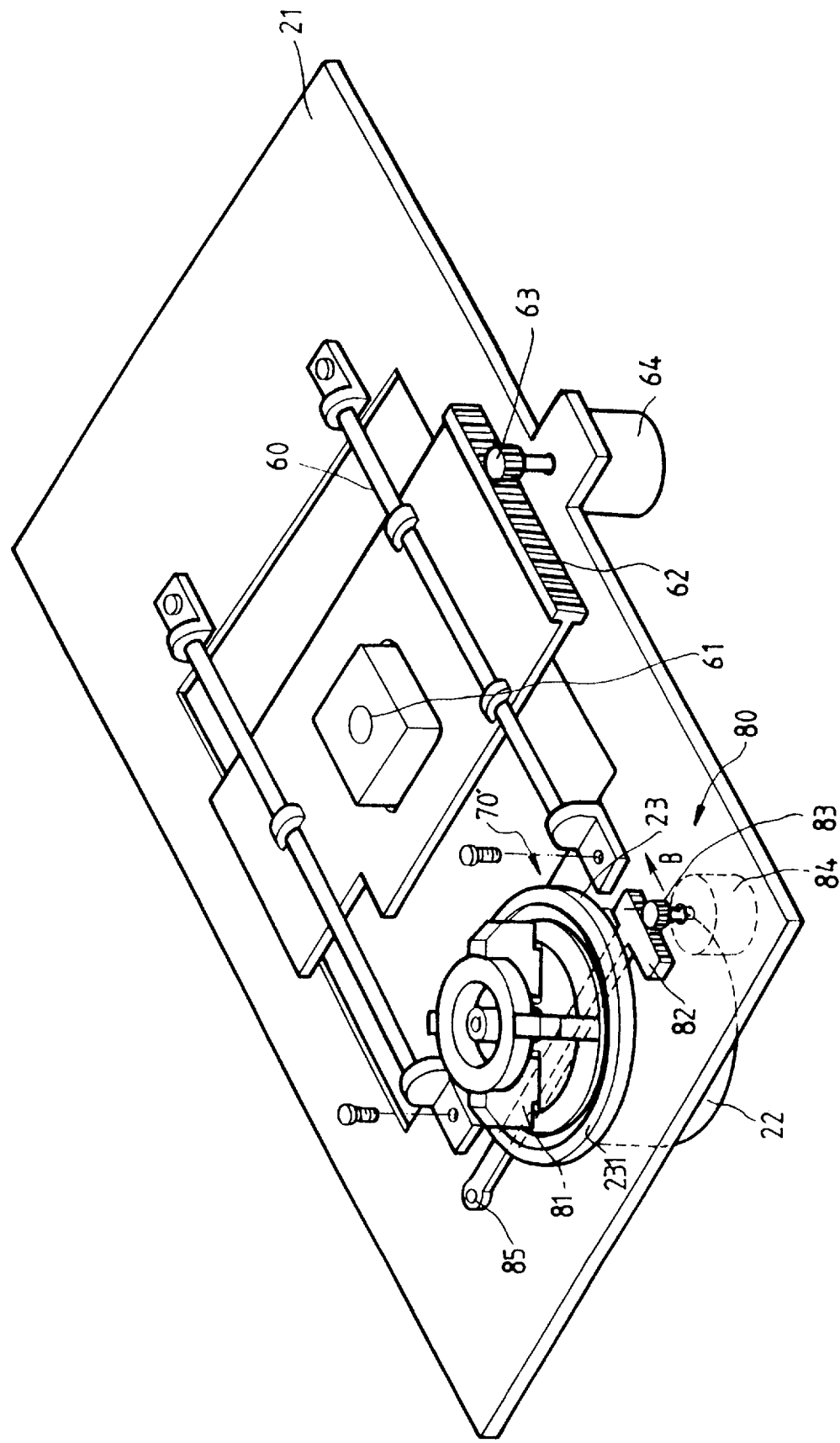
FIG. 10 is a perspective view showing the essential parts of a disk drive having an eccentricity correction device according to a second embodiment of the present invention.

Referring to FIG. 10, the disk drive having the eccentricity correction device according to this embodiment comprises pickup moving means for moving the pickup 61 along the radial direction of the disk 1 (see FIG. 11), and an eccentricity correction device for correcting the eccentricity of the disk 1 rotated by the spindle motor 22.

The eccentricity correction device comprises a disk moving portion 70' installed on the turntable 23 to move the rotating disk 1 from the rotating center of the turntable 23 by a predetermined distance, and moving means 80 installed on the base frame 21 to appropriately move the disk moving portion 70'.

Figure 12:
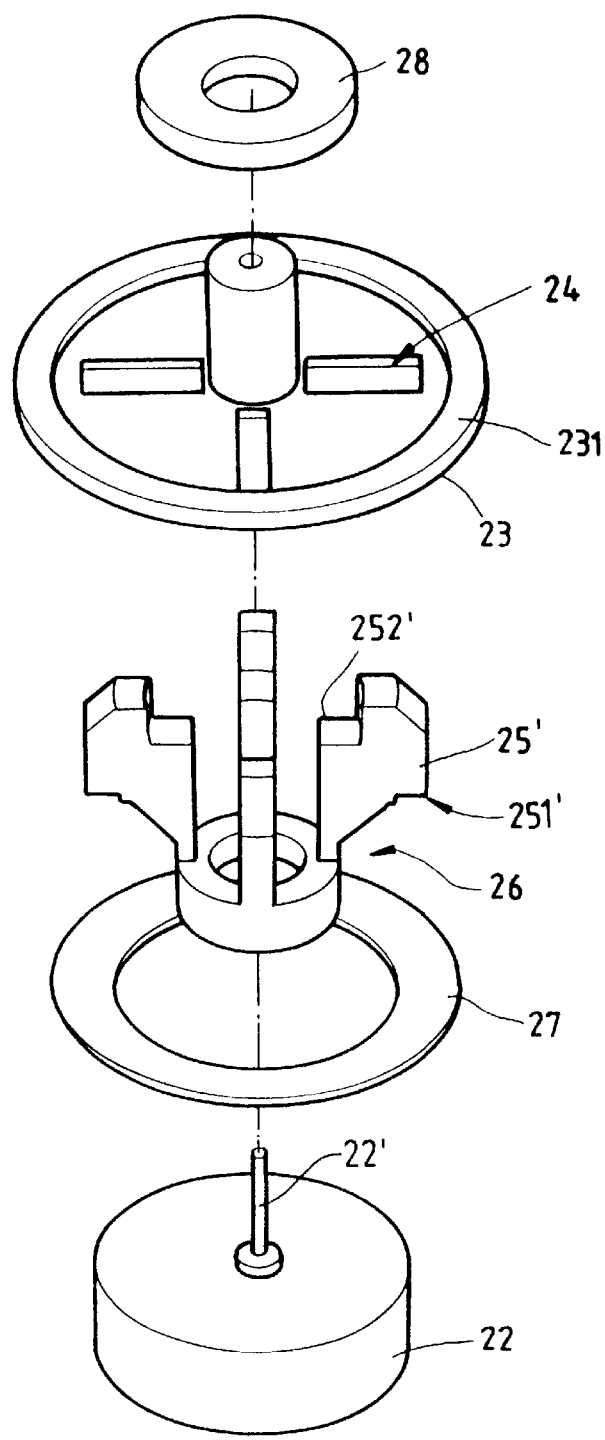
FIG. 12 is an exploded perspective view showing a disk moving portion of the eccentricity correction device in the disk drive of FIG. 10.

The disk moving portion 70' will be described with reference to FIGS. 10, 12, and 13. The turntable 23 on which a plurality of holes 24 are symmetrically formed is fixedly attached to the shaft 22' of the spindle motor 22 installed on the base frame 21. The central ring 26 on which protrusions 25' having first and second steps 251' and 252' are formed is installed between the turntable 23 and the spindle motor 22. The protrusions 25' on the central ring 26 pass through the holes 24 in the turntable 23, and protrude higher than the upper surface 231 of the turntable 23. Also, the central ring 26, as described later, is installed so that it can be moved from the rotating center of the turntable 23 by a predetermined distance via the moving means 80.

The ring 27 for supporting the central ring 26 is installed between the first step 251' formed on the protrusions 25' and the upper surface 231 of the turntable 23, to prevent the central ring 26 from contacting the base frame 21.

Figure 13:
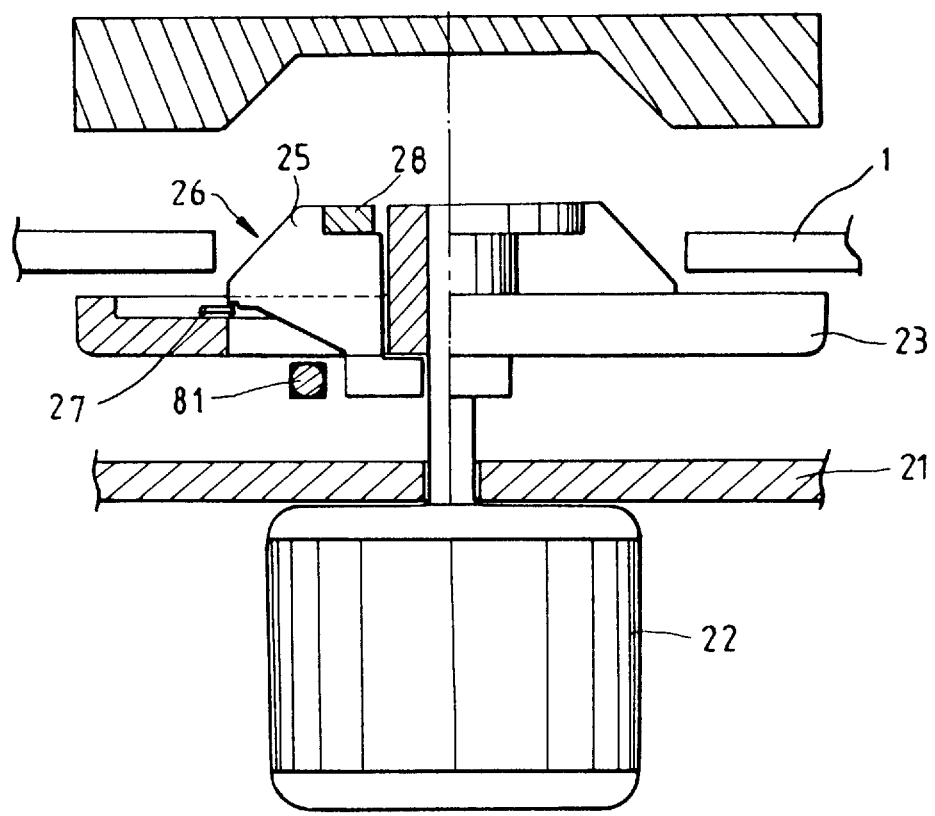
FIG. 13 is a sectional view showing the disk moving portion of FIG. 12.

The magnet 28 is disposed on the second step 252' of the protrusions 25' to secure the disk 1 loaded on the turntable 23 closely thereto by magnetically attracting the clamp 50 (FIG. 13).

Figure 11:
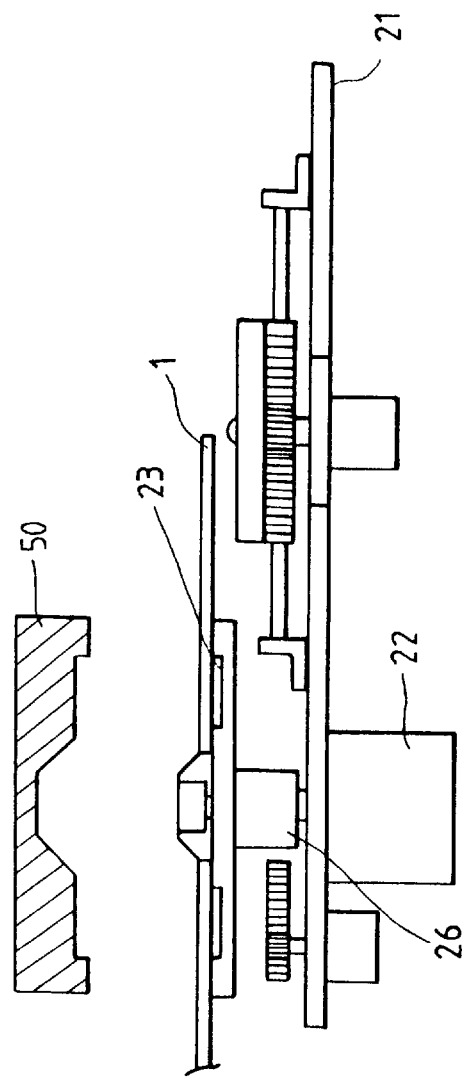
FIG. 11 is a side view of the disk drive of FIG. 10.

The moving means 80 will be described with reference to FIGS. 10 and 11. The moving means 80 includes a lever 81 connected at one end thereof to the base frame 21 by a hinge 85, and a pivoting means installed at the other end of the lever 81 for pivoting the lever 81 around the hinge 85 by a predetermined angle. The pivoting means includes a rack 82 formed on the other end of the lever 81, a pinion 83 engaged with the rack 82, and a motor 84 for rotating the pinion 83. This moving means 80 pivots the lever 81 in the direction of arrow B and in the opposite direction around the hinge 85 according to the rotating direction of the motor 84.

The disk drive having the eccentricity correction device according to the present invention with the components described above operates as follows.

In the same manner as that of the first embodiment, when the disk 1 is loaded on the turntable 23, the pickup 61 projects a laser beam onto the tracks of the disk 1, and then reads the degree of the eccentricity. Then, an unshown controller counts the degree of the eccentricity of the tracks. When the counted value exceeds the allowable error range, the controller stops the rotation of the spindle motor 22 to be located such that the eccentricity of the tracks can be compensated for by pivot movement of the lever 81, for example, the eccentricity direction is perpendicular to the lengthwise direction of the lever 81. Next, the motor 84 of the moving means 80 rotates and the lever 81 on which the rack 82 is formed pivots around the hinge 85 so that the eccentricity of the central ring 26 (see FIG. 11) in the disk moving portion 70' is corrected.

The disk drive having an eccentricity correction device according to the present invention properly corrects the eccentricity of a rotating disk so that accurate tracking is possible and errors generated when recording and reproducing can be prevented.

It is contemplated that numerous modifications may be made to the disk drive of the present invention without departing from the spirit and scope of the invention as defined in the following claims.

What is claimed is:

1. A disk drive comprising:

a base frame;

a spindle motor supported by said base frame and having a shaft;

a turntable, attached to the shaft of said spindle motor, for loading a disk thereon, said turntable defining a center of rotation;

a clamp for securing the disk onto said turntable;

a disk moving portion for supporting the disk by being inserted into a center hole of the disk, and moving the disk by a predetermined distance in a horizontal direction with respect to the disk from the center of rotation of said turntable;

means for moving said disk moving portion by a predetermined distance;

wherein said moving means comprises a lever hinged on said base frame at one end thereof by a hinge and means installed at another end of said lever, for pivoting said lever around said hinge, and wherein said lever moves said disk moving portion horizontally; and wherein said pivoting means comprises a rack formed at the other end of said lever opposite said hinge of said lever, a pinion engaged with said rack, and a motor for rotating said pinion.

2. The disk drive as claimed in claim 1, wherein said turntable has a plurality of holes symmetrically formed therein, and said disk moving portion comprises a central ring interlocking with said moving means and moving horizontally by a predetermined distance from the center of rotation of said turntable, and a plurality of protrusions formed on said central ring for supporting the disk by passing through said holes in said turntable and being inserted into the center hole of the disk.

3. The disk drive as claimed in claim 2, wherein a magnet is installed on said protrusions for magnetically attracting said clamp and securing the disk onto said turntable.

4. The disk drive as claimed in claim 2, further comprising a support ring for supporting said disk moving portion so that said disk moving portion can move by a predetermined distance on said turntable.

* * * * *